(12) United States Patent
Ho et al.

(10) Patent No.: US 7,097,778 B2
(45) Date of Patent: Aug. 29, 2006

(54) PROCESS FOR FABRICATING A MICRO-OPTICAL LENS

(75) Inventors: Chong-Long Ho, Taoyuan (TW); Wen-Jeng Ho, Taoyuan (TW); Jy-Wang Liaw, Taoyuan (TW)

(73) Assignee: Chunghwa Telecom Co., Ltd., Taoyuan (TW)

( * ) Notice: Subject to any disclaimer, the term of this patent is extended or adjusted under 35 U.S.C. 154(b) by 107 days.

(21) Appl. No.: 10/833,955

(22) Filed: Apr. 28, 2004

(65) Prior Publication Data

US 2005/0242056 A1    Nov. 3, 2005

(51) Int. Cl.
*B29D 11/00* (2006.01)

(52) U.S. Cl. .................... 216/26; 264/1.32
(58) Field of Classification Search ............ 216/26
See application file for complete search history.

(56) References Cited

U.S. PATENT DOCUMENTS

| | | |
|---|---|---|
| 5,079,130 A | 1/1992 | Derkits |
| 5,225,935 A | 7/1993 | Watanabe |
| 5,286,338 A | 2/1994 | Feldblum |
| 5,298,366 A | 3/1994 | Iwasaki |
| 5,324,623 A | 6/1994 | Tsumori |
| 5,420,722 A | 5/1995 | Bielak |
| 5,646,928 A | 7/1997 | Wu |
| 5,963,577 A | 10/1999 | Snyder |
| 6,160,672 A | 12/2000 | Chan |
| 6,249,034 B1 | 6/2001 | Li |

OTHER PUBLICATIONS

Kato et al., "PLC Hybrid Integration Technology and Its Application to Photonic Components", IEEE Journal Of Selected Topics In Quantum Electronics, vol. 6, No. 1, Jan./Feb. 2000, pp. 4-13.

*Primary Examiner*—Allan Olsen
(74) *Attorney, Agent, or Firm*—Rabin & Berdo, P.C.

(57) ABSTRACT

A process for fabricating a micro-optical lens comprises forming a wall post structure on a substrate, coating with a polymeric film on the wall post, then making it adhering over both sides of the wall post structure by a transverse etching on the substrate around the base of posts. After an isolating process and a proper heating treatment, said polymeric film cohering to form a plano-convex lens. By controlling the respective amount of the polymeric film on both sides of said wall post structure, the polymeric film can combine with the wall post structure to form a composite material biconvex micro-lens, plano-convex micro-lens and the like. Alternatively, a single material micro-lens can be formed by imaging the profile of the polymeric micro-lens on the wall post structure via an etching process.

24 Claims, 14 Drawing Sheets

PROCESS FOR FABRICATING A MICRO-OPTICAL LENS

BACKGROUND OF THE INVENTION

1. Field of the Invention

The invention relates to a process for fabricating a micro-optical lens, and in particular to a process for fabricating a micro-optical lens that can be fabricated in a usual manner as a process for manufacturing semiconductor so as to facilitate the integration of a micro-optical system or a micro-optoelectronic system.

2. Description of the Prior Art

Like common planar optical system, propagation of light in space within a planar micro-optical system or micro-optoelectronic system exhibits similarly problems of divergence, alignment of optical axis and the like. Further, the approach to the wavelength of the system due to the miniaturization of optical device yields crucial diffraction effect. For example, in an Edge-Emitting Laser Diode commonly used in a micro-photoelectric system, its active region 11 as shown in FIG. 1 has an elongated pore in the YZ section that produces a relatively greater divergent angle at distant field in Z-direction, which not only is not favor for propagation in space, but also results in a poor coupling efficiency with a waveguide (e.g., optical fiber). Under these circumstances, optical devices having focusing function or optical mode conversion (circularization of light bean) are frequently utilized to reduce loss.

The sub-module of an optical transceiver described in "PLC Hybrid Integration Technology and Its Application to Photonic Components", IEEE Journal Of Selected Topics In Quantum Electronics, vol. 6, No. 1, 2000, pp. 4–13 used gradient-index light guide to modify mode of light beam and hence promote the coupling efficiency. However, this approach involves finer and more sophisticated processes, such as etching of gradient-index waveguide, laser specular etching, secondary epitaxy and the like. Furthermore, in this case, the gradient-index waveguide was attached directly on the optical output terminal of a light-emitting element (semiconductor laser) resulting into a concern on the yield rate. Moreover, U.S. Pat. No. 5,963,577 and 6,160,672 provided optical device (such as spherical lens, cylindrical lens and the like) on a substrate of a planar micro-photoelectric system to promote coupling efficiency. However, this approach used optical device of a size higher than several hundred micrometer that forced the system substrate to have a receptive slot having a corresponding size. This would invariably enlarges the dimension of the system substrate as well as the complexity of production. In addition, an optical device needs an anchorage mechanism (e.g., an adhesive) to strengthen the mechanical characteristics of the system. U.S. Pat. No. 5,420,722 disclosed a laser module wherein a micro-lens was loaded vertically at the light output end to correct the light mode. This module needed also an additional anchorage mechanism and the application of a single element should be cut after mounting the micro-lens. Further, in the micro-optical read/write head for light storage access disclosed in U.S. Pat. No. 5,646,928, desired optical devices such as, for example, Fresnel lens, beam splitter, reflector and the like were formed on a Si substrate through a semiconductor micro-electro-mechanical process, and were then raised up to form a micro-optical system with its light axis parallel to the substrate and at the same time afford an essential support. It is obviously, however, that, in addition to the complexity resided in their establishment, mechanical and thermal stabilities of this micro-system constituted main concerns in its application.

In U.S. Pat. Nos. 5,079,130; 5,225,935; 5,286,338; 5,298,366; 5,324,623' and 6,249,034, processes for forming micro-lens by baking a photoresist at elevated temperature, and applications of said micro-lens were disclosed. However, since all of those micro-lenses were planar micro-lenses (with their light axis parallel to the substrate), they were not applicable directly in planar micro-optical or micro-photoelectric systems with their light axis parallel to their substrate. Nevertheless, smooth surfaces of these lenses generated through by means of the surface tension on the photoresist did afford an improvement on the coupling efficiency of the optical system.

Accordingly, it is obvious that conventional techniques have following disadvantages to be improved:
1. Complex manufacturing process.
2. Larger optical devices, and increase of the size of the system substrate are necessary for improving coupling efficiency.
3. They are not applicable directly in a planar micro-optical or micro-photoelectric systems with light axis parallel to the substrate.

In the integration of micro-lens and micro-optical system, most of them need anchorage or support.

SUMMARY OF THE INVENTION

The object of the invention therefore is to provide a process for fabricating micro-optical lens to simplify the establishment of a micro-optical system.

A micro-optical lens is a upstanding lens. Process for their fabrication comprises of forming wall post structure on the substrate (e.g., semiconductor or glass substrates) of the micro-optical or micro-photoelectric systems. The height of the wall post structure defined the height within which a micro-lens can be formed. After coating with polymeric materials (e.g., photoresist), etching on side of the substrate around the base of the post is carried out to attach vertically the polymeric material film on both sides of the wall post structure. With a separate process and an appropriate heating treatment, the polymer film adhered vertically over sides of the wall post structure will cohere due to surface tension and hence forms a planar convex lens. Thereafter, the wall post structure can be bound together directly as composite material micro-lens. Alternatively, a shape can be imaged on the wall post structure by an etching process to form a single material micro-lens.

Moreover, a symmetric or asymmetric micro-lens can be formed by adjusting the amount of photoresist on each side of the wall post structure, respectively.

The process according to the invention defines the size of the micro-lens by the height of the wall post structure, and also, defines the curvature radius and thickness of the micro-lens by the volume of the polymer film. In another word, the process according to the invention takes advantage of the conventional semiconductor manufacturing process to control accurately the position, dimension and light axis height for forming the upstanding micro-lens. With this, the integral molding for multiple micro-lenses set and the automatic light axis focusing ability can be afforded in the application of integrated micro-optical or micro-photoelectric systems. In addition, by virtue of the cylindrical structure of the semiconductor material, a filtering effect against wave range with wavelength lower than a specific value can be provided and hence forms a micro-lens filter.

These features and advantages of the present invention will be fully understood and appreciated from the following detailed description of the accompanying Drawings.

DETAILED DESCRIPTION OF THE PREFERRED EMBODIMENT

Accordingly, the invention provides a process for fabricating micro-optical lens that can be used in the integration of micro-optical or micro-photoelectrical system. More specifically, this process for fabricating micro-optical lens takes advantage of the conventional semiconductor manufacturing process, comprising formation of a wall post structure on a substrate selected (e.g., semiconductor substrate, glass substrate), coating and adhering vertically on its both sides with a polymeric material (e.g., photoresist) film, heat treating the polymer film such that it can cohere into a plano-convex lens due to surface tension, and imaging the polymeric lens on the wall post structure through an etching process, wherein a symmetric or asymmetric micro-optical lens is formed by controlling the volume of the film on both sides of the wall post structure.

The process for fabricating micro-optical lens according to the invention will be illustrated in greater detail with reference to the following three embodiments. In these embodiments, specific photoresists, and substrates and wall post structure of particular materials are used. Nevertheless, the central spirit is suitable for other combination of materials. For example, micro-optical lens fabricated in Embodiment 1 is a biconvex lens that, depending on the requirement of its use, can be simple composite material (combination of photoresist and silicon dioxide), symmetric/asymmetric biconvex lens, or, further, a single material (silicon dioxide) symmetric/asymmetric biconvex lens with higher stability formed through an etching process. In Embodiment 2, based on Embodiment 1, a photoelectric element platform loaded with a plano-convex lens at the front end is fabricated. This platform has a height equal to the center of the lens so as to afford a passive correcting mechanism. This embodiment can be regarded as a prototype of the application of the invention in micro-optical/micro-optoelectronic system. In the third embodiment, the micro-optical lens fabricated therein is a biconvex lens with its wall post structure made of semiconductor material (indium phosphide). A plano-convex lens formed from photoresist was adhered vertically on each side of the wall post structure, respectively. The interface between the photoresist lens and the semiconductor wall post can afford an anti-reflective mechanism by means of a dielectric layer. The composite lens fabricated in this embodiment can further provide light filtering effect by virtue of the semiconductor wall post.

FIG. 2A to H are schematic exploded view illustrating sections of biconvex lenses in each step in the process according to the first preferred embodiment.

Figure 2:
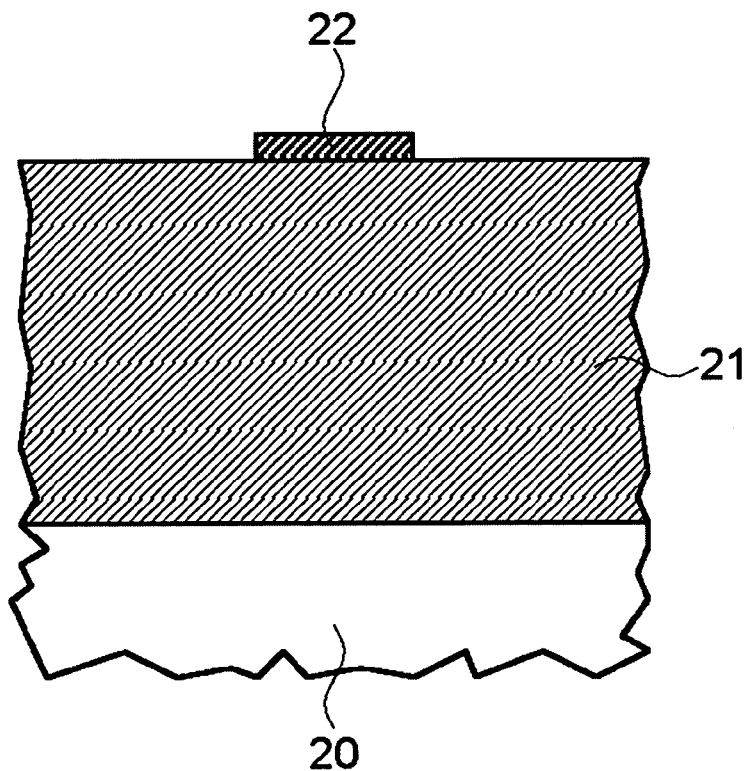
FIG. 2A~H is a schematic view showing the stepwise process according to the first preferred embodiment.
Figure 2:
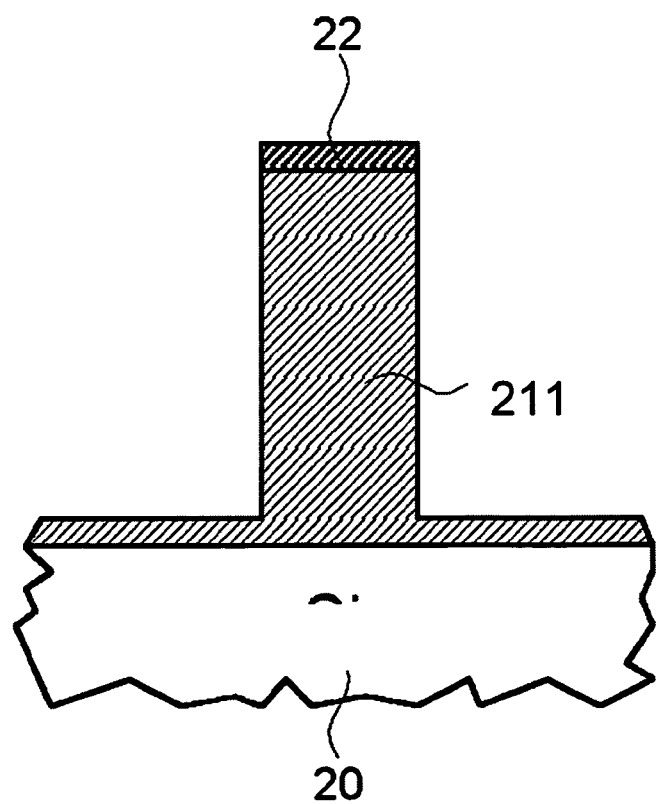
Figure 2:
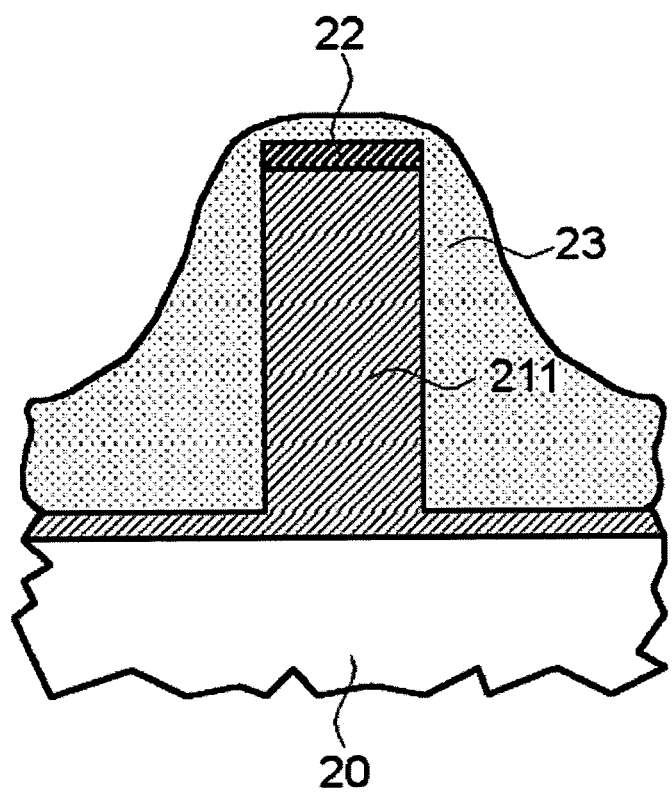
Figure 2:
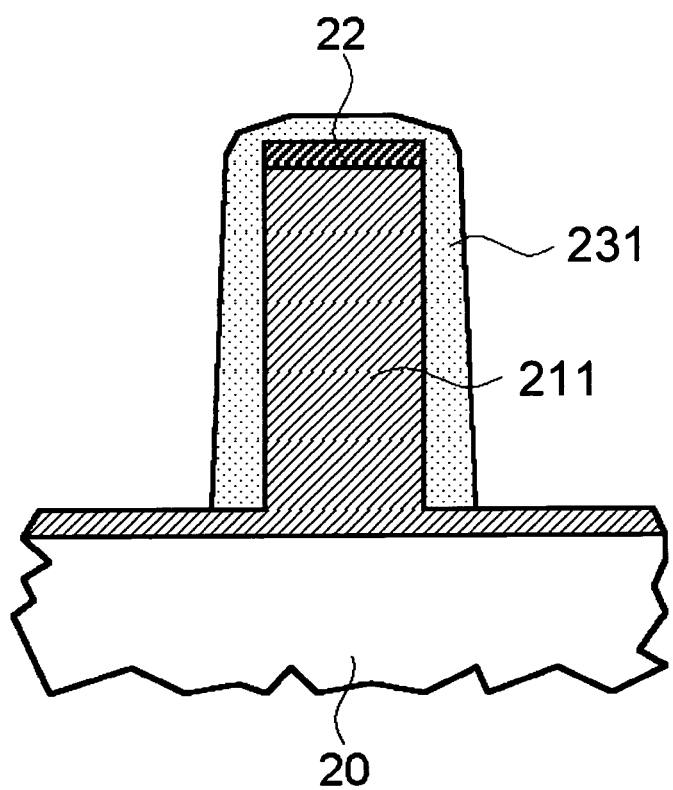
Figure 2:
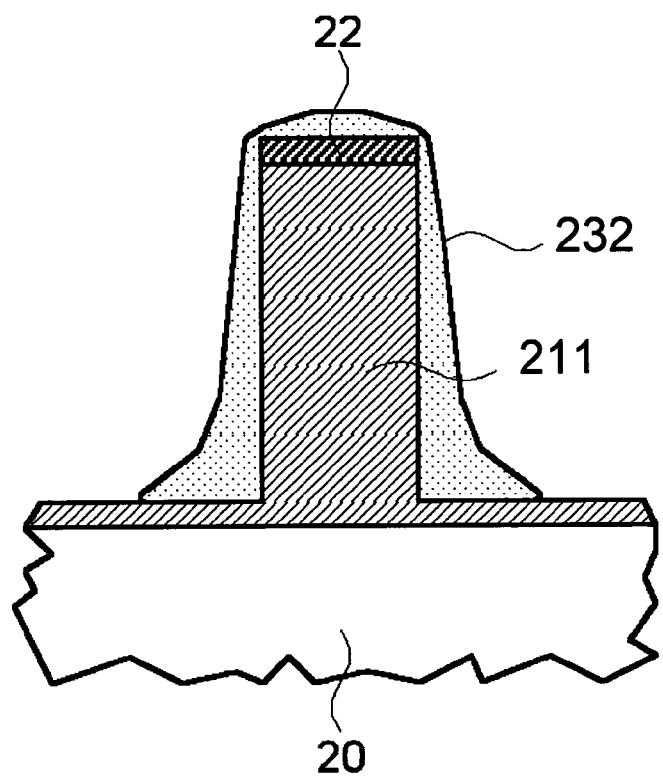
Figure 2:
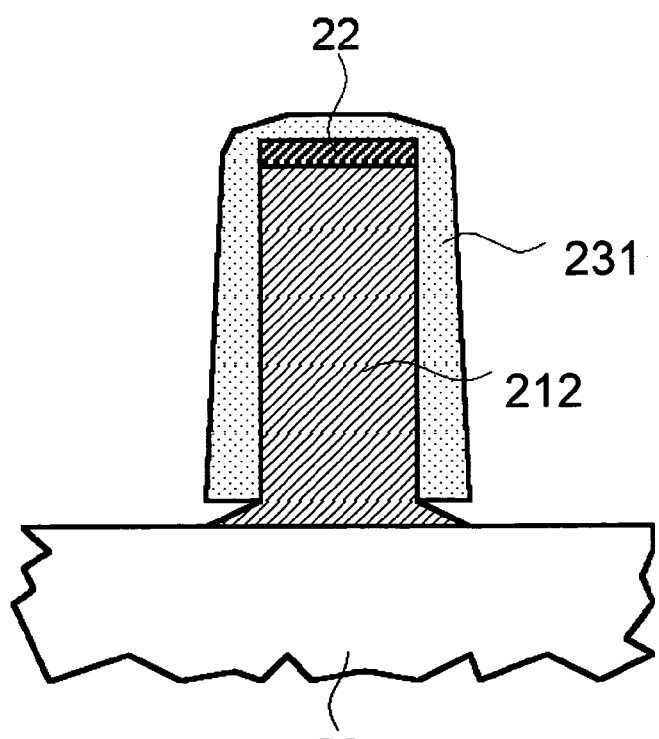
Figure 2:
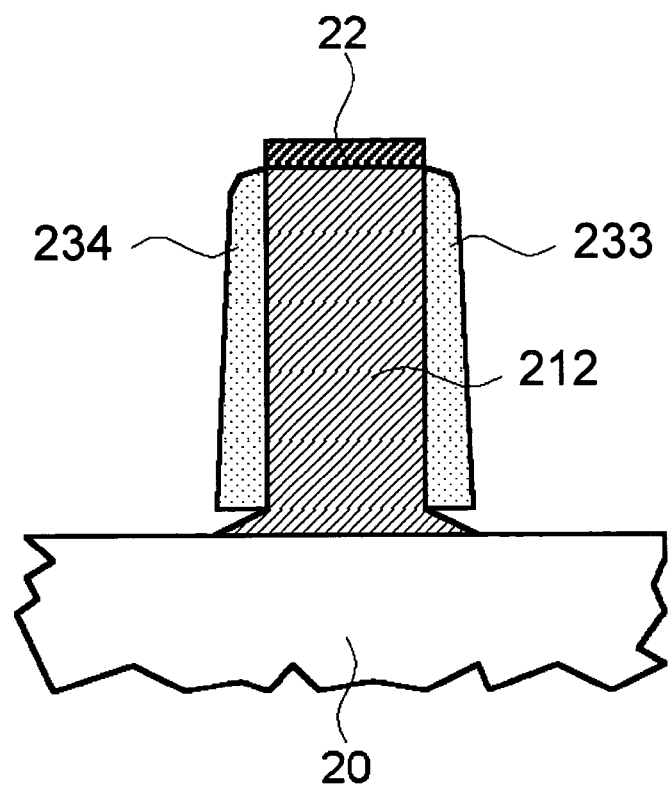
Figure 2:
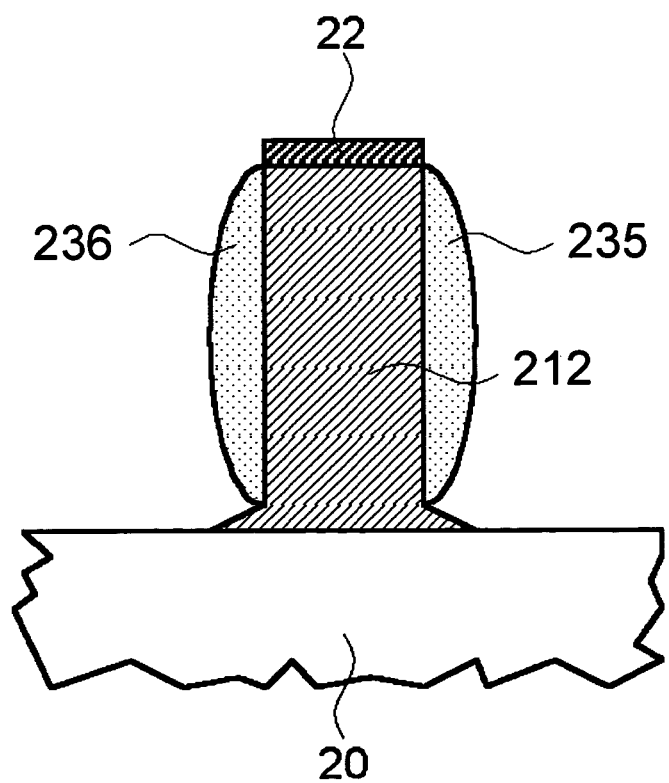
Figure 2:
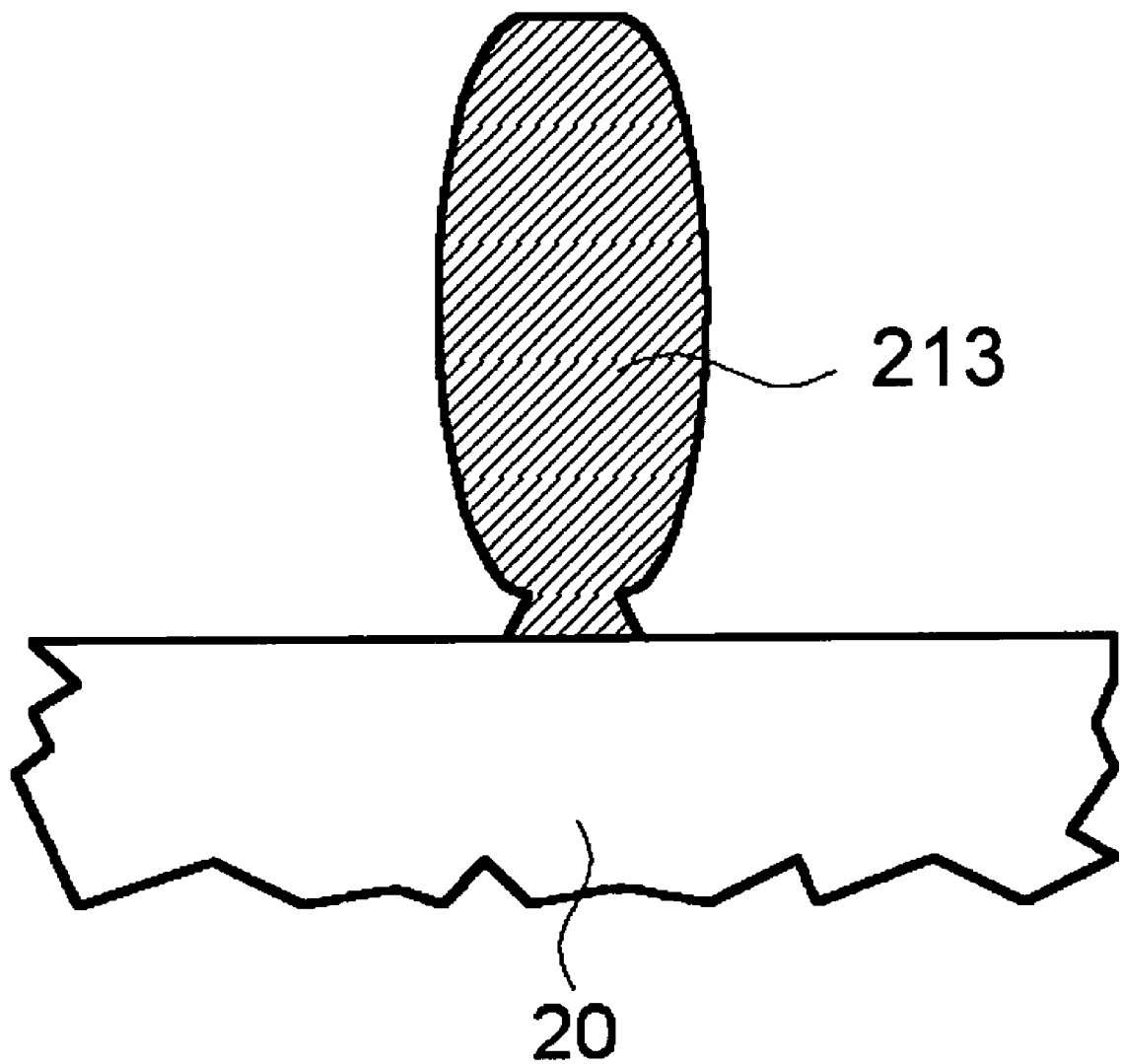

FIGS. 2A and 2B show a schematic scheme used to form a silicon dioxide wall post structure 211 on a silicon substrate 20 through an etching process. At first, a layer of silicon dioxide 21 of an appropriate thickness (about 30 to 60 micrometer) is formed on the silicon substrate 20 by a flash chemical vapor deposition process. This thickness must be greater than the height of the micro-lens designed (about 25 to 55 micrometer), while the refractive index of the silicon dioxide is approximately 1.45–1.47. In order to define and form the wall post structure, an etching mask 22 must be applied on the silicon dioxide layer to define the width of the wall post structure. To this end, chrome film or nickel-chrome film of a thickness of about 5000 Å can provide better etching masking effect. Under high speed etching by Inductively Coupled Plasma- Reactive Ion Etching (ICP-RIE) on silicon dioxide layer, an etching selectivity of 100 or more can be obtained. The definition and formation of the chrome film mask can be accomplished by a conventional microlithographic process in combination with a metal lifting or metal etching process. Its width (ca 30 to 70 micrometer) must greater than the thickness of the micro-lens (about 20 to 60 micrometer) designed. In this embodiment, a gas composition of C4F8/O2 is used in the etching of silicon dioxide wall post structure. With this, the etching rate can be up to about 0.3 micrometer/minute, and the etching depth can be 25 to 55 micrometer that corresponds to the height of the micro-lens thus formed. After formation of the wall post structure is accomplished, the film coverage with a polymeric material can be carried out. In this embodiment, the ma-P series of photoresist available from Micro Resist Technology Company is used to apply on the surface of a specimen by a spin-coating process. FIG. 2O illustrates schematically the distribution profile 23 of the photoresist after coating. The volume of the photoresist required for fabricating the micro-lens is defined by a micro-lithographic process. FIG. 2D shows with reference number 231 the photoresist 23 present after developing. At this stage, by baking the photoresist at an elevated temperature (higher than 120° C.) and due to its surface tension, the photoresist and adhering surfaces that are orthogonal with one another (the upper surface, side surface and bottom surface of the silicon dioxide wall post structure) will form a section 232 as shown in FIG. 2D'. For the formation of a lens from photoresist, the photoresist has to be a single adhered plane, while the biconvex lens needs only the side surface of the wall post structure. Further, for the photoresist to detach from the upper and bottom surfaces of the wall post structure, a dry and wet etching processes must be employed perfectly. Firstly, a wet etching process is employed to etch transversely on the silicon dioxide beneath the photoresist 231. In this embodiment, a dilute aqueous HF solution (e.g., 1HF:10H2O) or a buffer solution for oxide layer (BOE) is used to isolate the adsorption of the photoresist from the silicon dioxide at the bottom surface of the wall post structure. FIG. 2E shows at 212 the silicon dioxide wall post structure after the transverse etching. During the transverse etching, in order to prevent detaching of the bottom of the photoresist from the side surface of the wall post structure, a moderate baking at an elevated temperature (about 100° C.) before etching can increase the adsorption of the photoresist against the side surface of the wall post structure, and improves the uniformity of the micro-lens fabrication on the integral silicon wafer. Next, a dry etching process is used to remove the photoresist on the upper side of the wall post structure (the upper photoresist). In this embodiment, $O_2$ reactive ion etching (RIE) is used to remove this upper photoresist. Since the photoresist is applied by spin-coating, the photoresist on the upper side of the wall post structure (in particular, that near the corner) is much thinner than those on other plane. Therefore, after etching, as shown in FIG. 2F, the photoresist is already divided on both sides of the wall post structure, namely, 233 and 234. In this step, another intention of removing the photoresist on the upper side of the wall post structure resides on isolation of photoresists on the right and left sides so as to avoid the non-homogeneous or out-of-controlled state between photoresists on both sides during baking at the elevated temperature. With this, removal of the upper photoresist is carried out till this isolation effect is just attained, for example, the complete removal of the photoresist at corner, and is not necessarily to remove all the upper photoresist. Alternatively, the removal of the upper photoresist can be accomplished during the microlithography as shown in FIG. 2D by means of exposure or a long time developing. After the forgoing process, only photoresists adhered on both sides of the wall post structure remained separately, and form the basic structure for fabricating a micro-lens. Subsequent baking on this structure at 150° C. under nitrogen atmosphere for 10 minutes, photoresists on both sides cohere into a shape of piano-convex lens due to surface tension, as shown at 235 and 236 in FIG. 2G. Photoresist plano-convex lens thus obtained under the above-described condition exhibit a height of 25–35 micrometer, a thickness of 10–30 micrometer, and a curvature radius of about 12–40 micrometer. The height, thickness and curvature radius of these photoresist piano-convex lens can be adjusted by controlling the volume of the photoresist to meet the requirement of micro-optical/ micro-optoelectronic system. Therefore, a symmetric or asymmetric composite biconvex lens can be formed by controlling the volume of photoresist on both sides through a microlithographic process.

Figure 1:
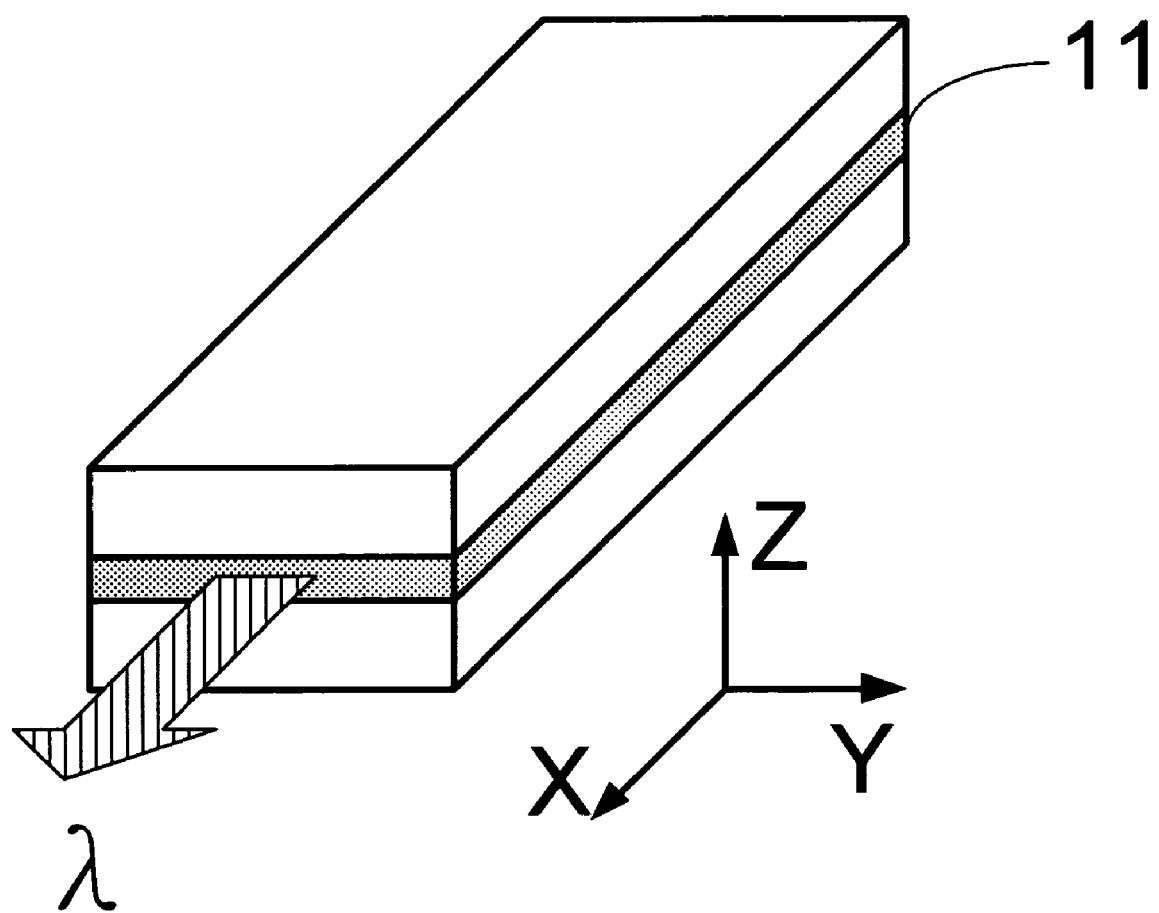
FIG. 1 is a schematic view of a element of a edge emitting type semiconductor laser.
Figure 3:
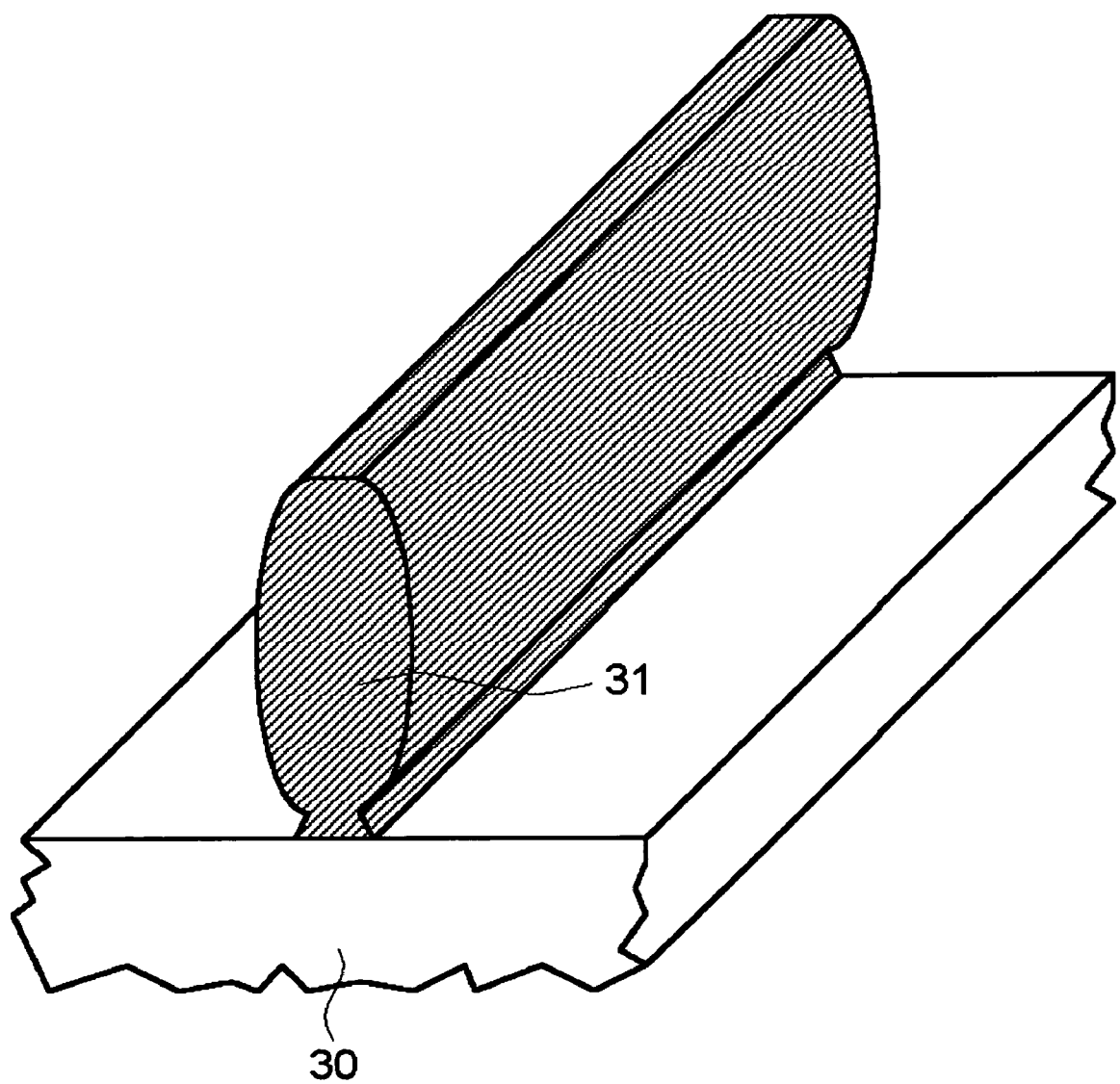
FIG. 3 is a schematic three-dimensional view showing the upstanding micro-lens formed in the first example.

Since the ma-P series photoresist (Micro Resist Technology Co., Ltd.) used in this embodiment exhibit a refractive index of 1.45–1.47, with a difference relative to the refractive index of silicon dioxide within 10% and hence a reflective loss of only −26 dB, it can be used directly as a composite material for fabricating biconvex micro-lens. Further, ma-P series photoresist belongs to positive type photoresist, it is susceptible to be catalyzed during using in a long period of exposure. Therefore, a negative type photoresist can be used instead, such as, for example, ma-N series (Micro Resist Technology Co., Ltd.) or BPR-100 (Shipley Co., Ltd.). Moreover, in further consideration of thermal stability (for later high temperature process) and weatherability, a dry etching process that has an ability of transverse etching (high isotropy) and low etching selectivity is used to image the profile of the photoresist lens over the silicon dioxide wall post structure to form a silicon dioxide single material biconvex lens 213 (the chrome film being removed) as shown in FIG. 3H. This dry etching process should be carried out under very low or even zero radio-frequency bias and using a gas composition of $CF_4/O_2$, such that the main etching mechanism on photoresist and silicon dioxide is chemical decomposition but not physical bombard or chemical deposition; such as the use of a dry chemical etching equipment (CDE, Chemical Dry/Downstream Etcher). With this, by adjusting etching selectivity through varying $CF_4/O_2$ composition ratio, another flexibility for changing the curvature radius of the micro-lens is attained. FIG. 3 depicts a schematic three-dimensional view of an upstanding silicon dioxide biconvex micro-lens 31 fabricated according to this embodiment. This micro-lens 31 exhibits a converging or focusing effect in Z direction relative the transverse element shown in FIG. 1.

FIG. 4A to 4F show schematic exploded views of each respective process step according the second preferred embodiment for forming a micro-photoelectric platform consisting of an element platform and a front plano-convex micro-lens.

Figure 4:
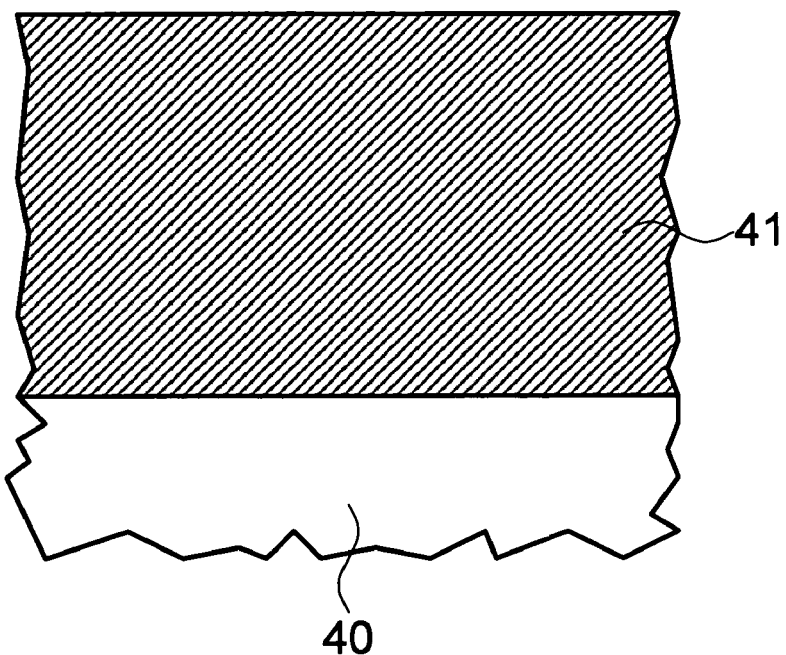
FIG. 4A~F is a schematic three-dimensional view showing the stepwise process according to the second example.
Figure 4:
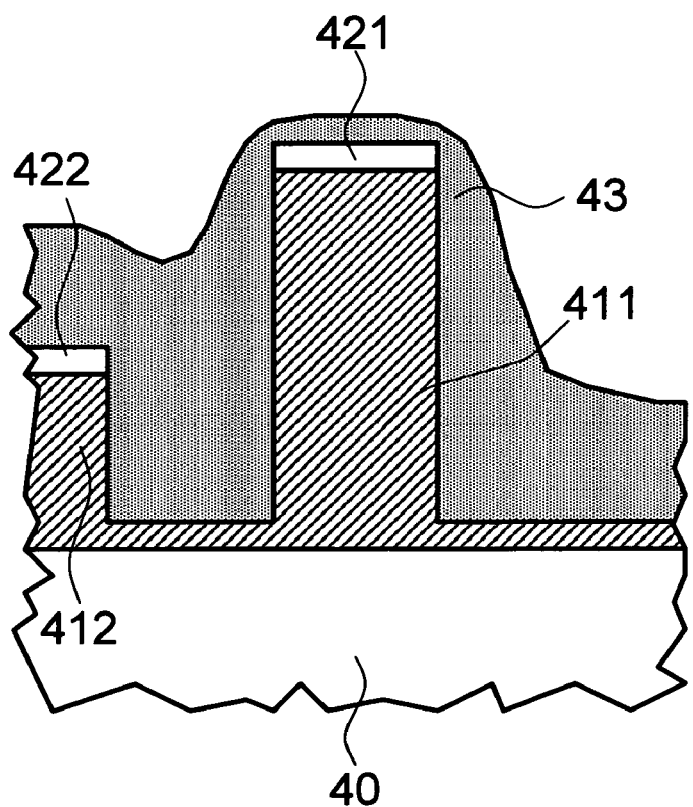
Figure 4:
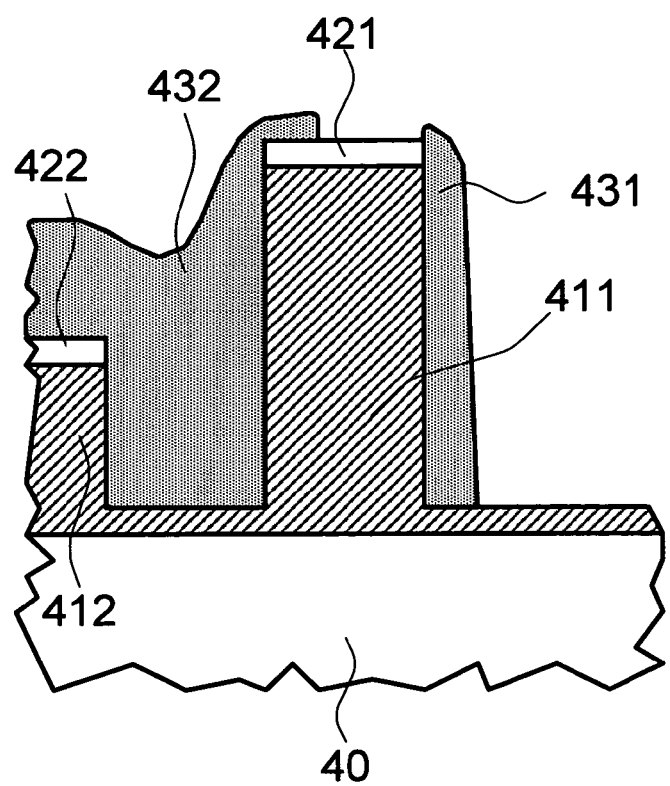
Figure 4:
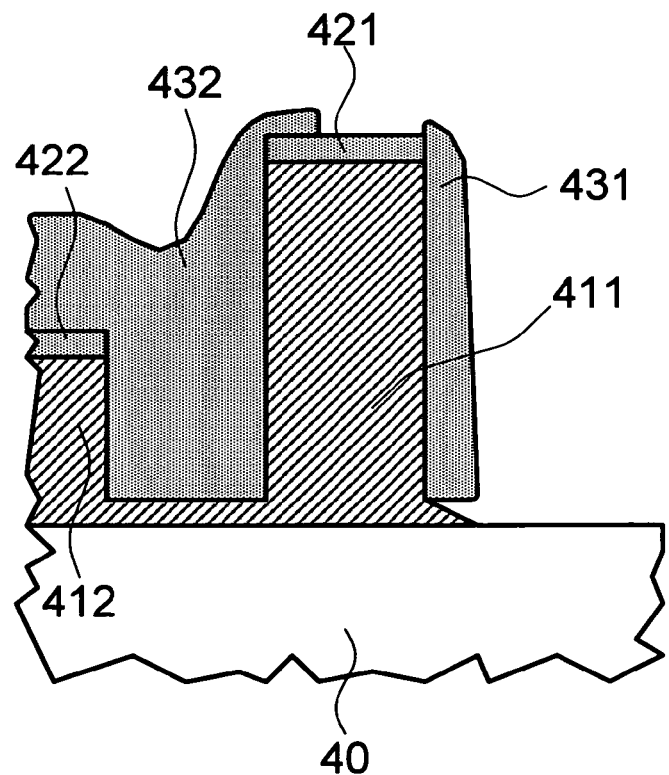
Figure 4:
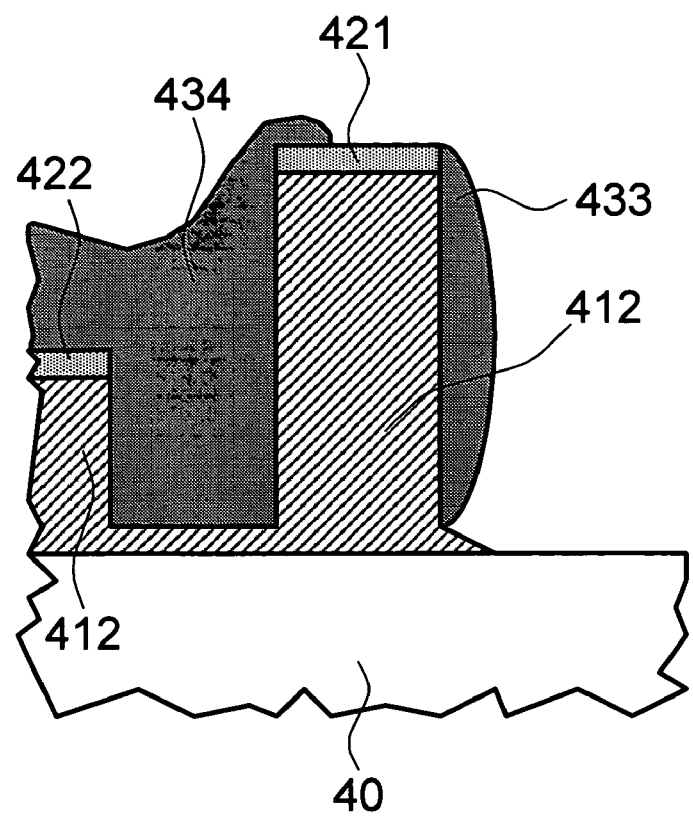
Figure 4:
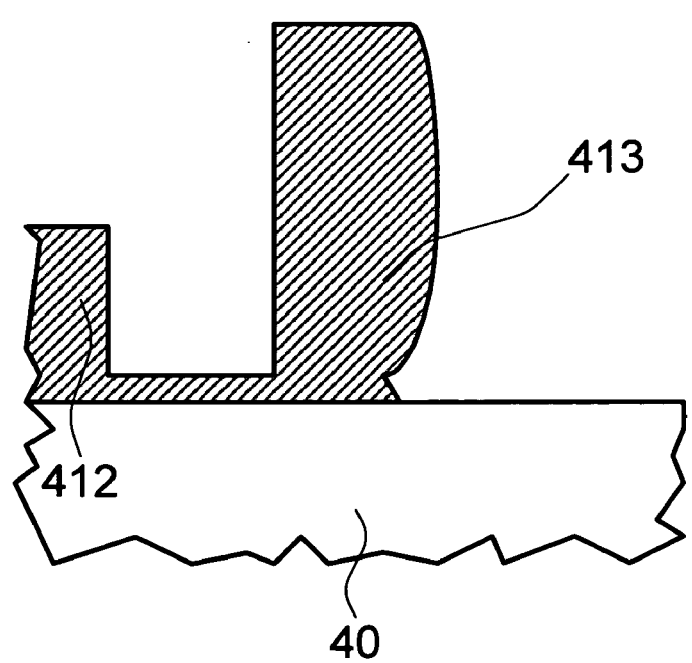

FIG. 4B depicts a silicon dioxide wall post structure 411 and silicon dioxide element platform 412 formed on a silicon substrate 40 by an etching process. Firstly, a silicon dioxide layer 41 with a proper thickness (about 60 micrometer) (FIG. 4A) is formed on a silicon substrate 40 through a flash plasma-enhanced chemical vapor deposition (PECVD), wherein the thickness of the silicon dioxide layer must be greater than the height (about 50 micrometer) of the micro-lens to be loaded, and the refractive index of silicon dioxide is about 1.45–1.47. An etching mask 421 is applied on the silicon dioxide layer to define the width of the wall post structure. After ICP-RIE etching of the silicon dioxide to a depth (about 25 micrometer) equal to the height of the lens to be formed, a second etching mask 422 is applied to define the size of the element platform. ICP-RIE is carried out further on the silicon dioxide layer until the overall etching depth is equal to the height (50 micrometer) of the lens to be formed. As the etching masks 421 and 422, chrome film (or nickel-chrome film) is used to attain better etching effect. With these etching masks, the high speed ICP-RIE etching on silicon dioxide can achieve an etching selectivity of 100 or more. The definition and formation of the chrome film mask can be accomplished by a conventional microlithographic process in combination with a metal lifting or metal etching process. In this embodiment, a gas composition of $C_4F_8/O_2$ is used in the etching of silicon dioxide wall post structure. With this, the etching rate can be up to about 0.3 micrometer/minute. After formation of the wall post structure 411 and element platform 412 is accomplished, the film coverage with a polymeric material can be carried out. In this embodiment, the ma-P series of photoresist available from Micro Resist Technology Company is used to apply on the surface of a specimen by a spin-coating process. FIG. 4B depicts schematically the photoresist distribution profile 43 after photoresist coating. By defining the volume of the photoresist required for the micro-lens by a microlithographic process, the photoresist 43 is then developed into 431 and 432 as shown in FIG. 4C. For formation of a lens from the photoresist by means of surface tension, it is essential to have only a single adhered plane. This piano-convex lens the needs just the side surface of the wall post structure. While the above-described microlithographic process has attained the purpose of removing the photoresist adhered on the wall post structure, the silicon dioxide layer underlying the photoresist 431 can be subjected then to a transverse etching by a wet etching process. In this embodiment, a dilute aqueous HF solution (e.g., $1HF:10H_2O$) or a BOE is used to isolate the adsorption of the photoresist from the silicon dioxide at the bottom surface of the wall post structure. FIG. 4D shows at 412 the silicon dioxide wall post structure after transverse etched. In order to prevent detaching of the bottom of the photoresist from the side surface of the wall post structure, a proper baking at an elevated temperature (about 100° C.) before etching can increase the adhesion between the photoresist and the side surface of the wall post structure, improve the uniformity of micro-lens fabricated on the integral silicon wafer. After the forgoing process, the photoresist film 432 attached on the right side of the wall post structure, as well as the element platform at the left side of the wall post structure are cladded within the photoresist 432, while photoresists at the right and left sides are isolated from each other. Subjecting this structure to bake at 120° C. in nitrogen atmosphere for 10 minutes results in cohesion of the photoresist 431 at the right side into lens shape due to surface tension, while the photoresist 434 at the left side dads the left side structure due to multiple adhered surface, and presents as the minimal surface area. Under the forgoing conditions, the right side photoresist lens has a height of about 50 micrometer, a thickness of 13 micrometer, and a curvature radius of about 30 micrometer. The height, thickness and curvature radius of this photoresist micro-lens can meet the requirement of the micro-photoelectric system by controlling the volume of the right side photoresist.

Next, a dry etching process with a high isotropy and low etching selectivity to image the profile of the right side photoresist plano-convex lens on the silicon dioxide wall post structure to form a silicon dioxide single material plano-convex lens 413 (with chrome film removed) as shown in FIG. 4F., while the left side element platform 412 remains its original state due to the coverage of the photoresist. This dry etching process should be carried out under very low or even zero radio-frequency bias and using a gas composition of $CF_4/O_2$, such that the main etching mechanism on photoresist and silicon dioxide is chemical decomposition but not physical bombard or chemical deposition, such as the use of a dry chemical etching equipment (CDE, Chemical Dry/Downstream Etcher). With this, by adjusting etching selectivity through varying $CF_4/O_2$ composition ratio, another flexibility for changing the curvature radius of the micro-lens is attained.

By providing a light emitting element on the element platform according to the invention, such as using flip chip bonding technology, the mode modification or light beam circularization can be achieved, while by providing a photoreceiver on the element platform of this embodiment, the purpose of converge or focusing of the incident light can be attained; both can improve the coupling efficiency.

FIG. 5A to 5H show the schematic view of sections of the structure at each process step for fabricating composite material biconvex micro-lens according to the third preferred embodiment of the invention.

Figure 5:
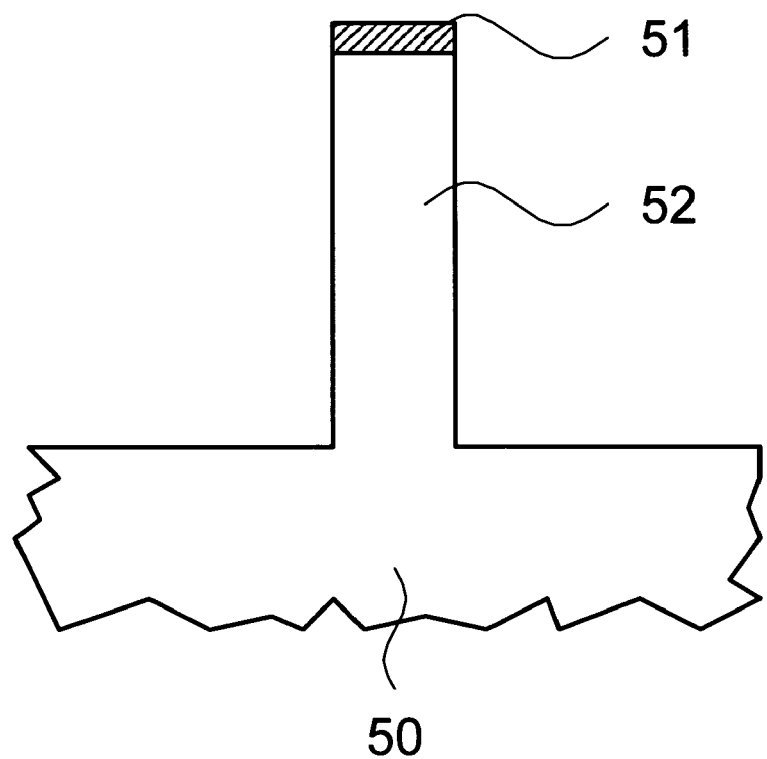
FIG. 5A~H is a schematic view showing the stepwise process according to the third example.
Figure 5:
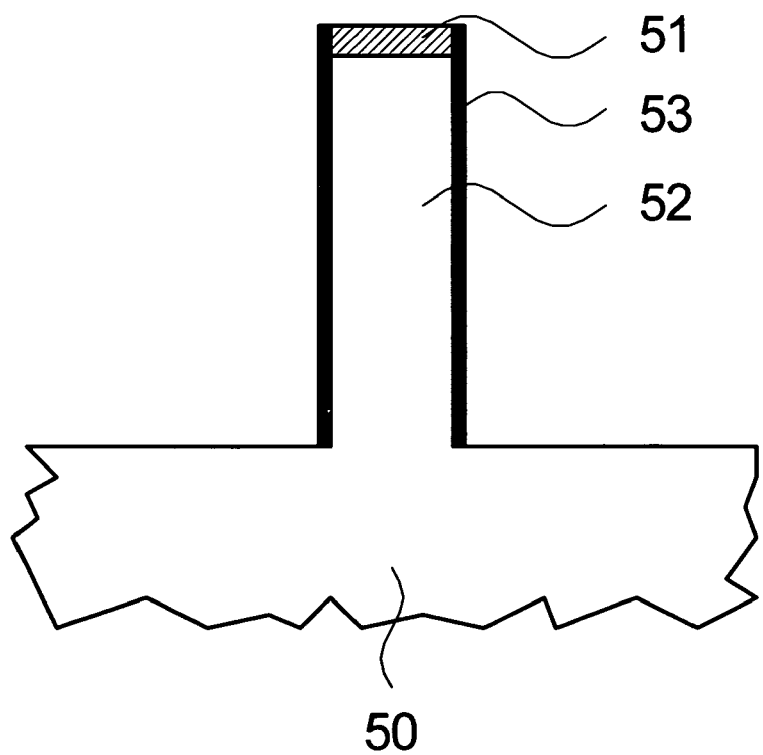
Figure 5:
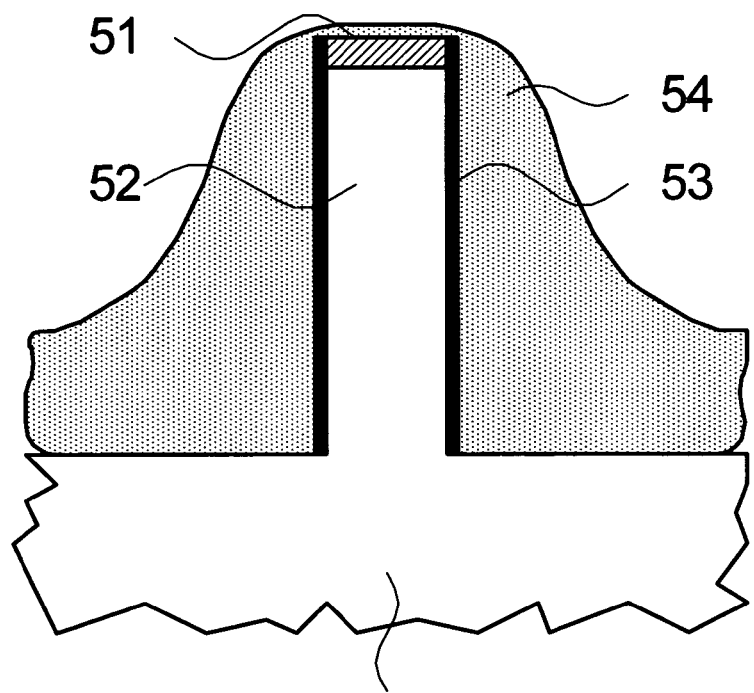
Figure 5:
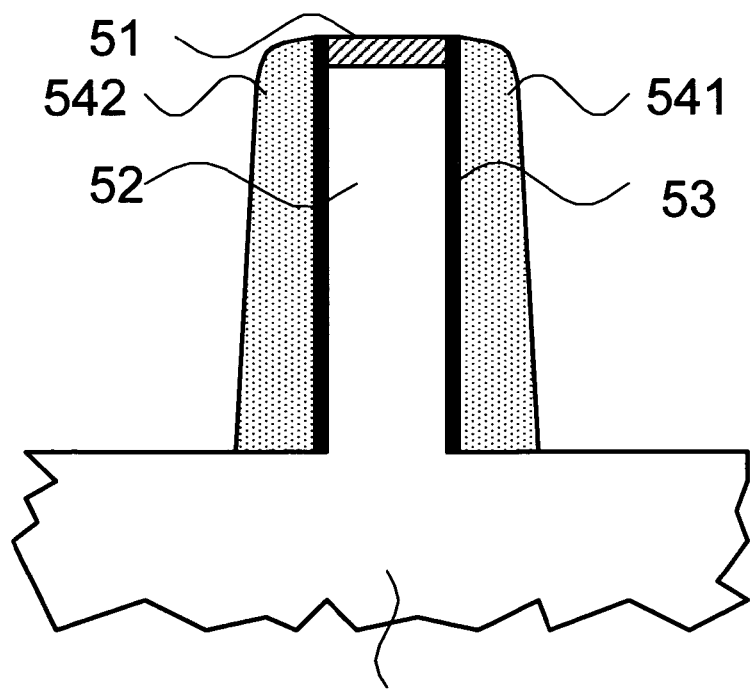
Figure 5:
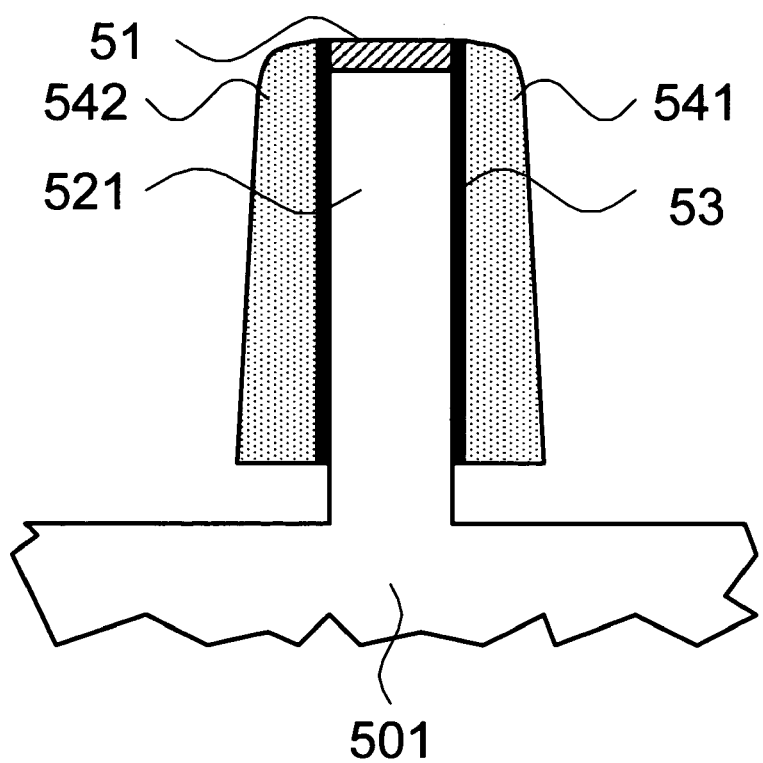
Figure 5:
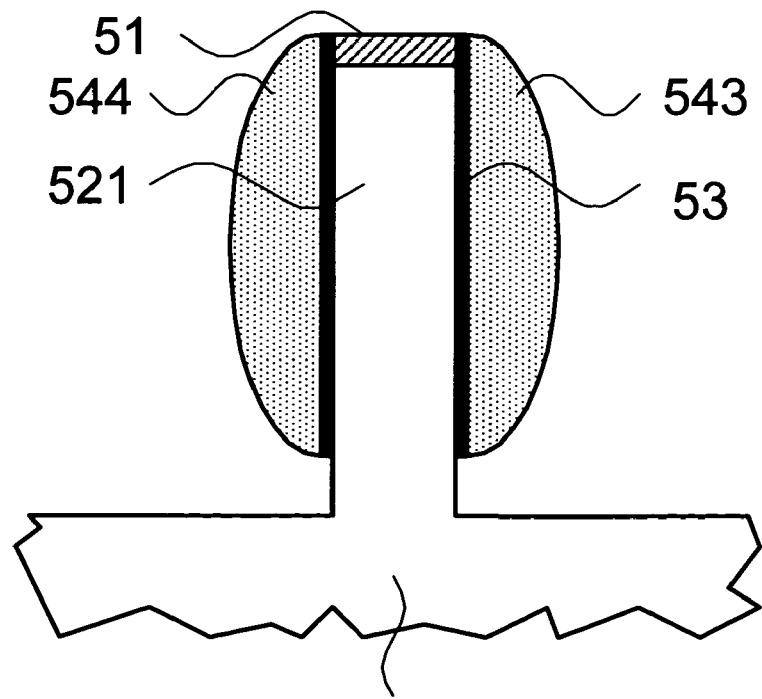
Figure 5:
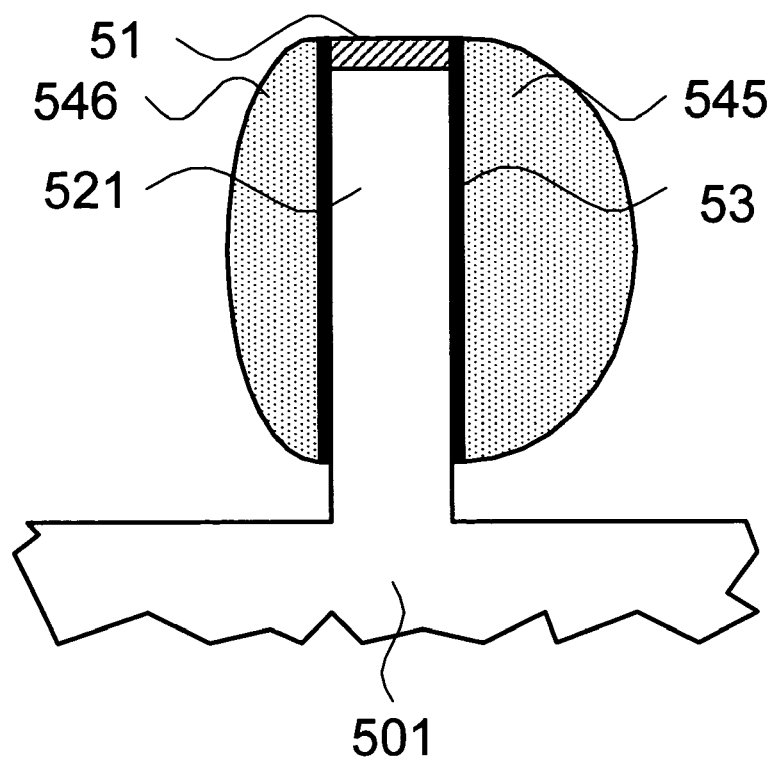
Figure 5:
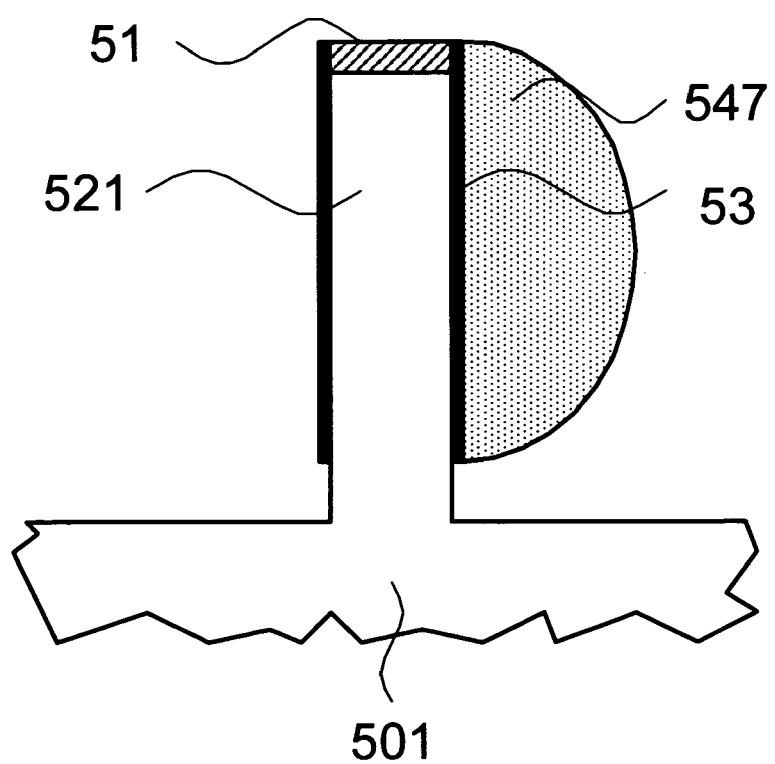

FIG. 5A and 5B illustrate a process comprising defining a etching mask 51, forming a wall post structure 52 on a semiconductor substrate 50 by a well-known semiconductor etching process, and plating a anti-reflective dielectric layer 53 on both sides of the wall post structure by a well-known dielectric material plating and a etching process. In this embodiment, the semiconductor substrate 50 is a n-type indium phosphide (InP) substrate, on which, by plasma-enhanced chemical vapor deposition (PECVD), photolithography, and reactive ion etching (RIE) processes, a silicon oxide (SiOx) etching mask with a thickness of 0.2 micrometer and a width of 30 micrometer is defined, wherein by carrying out a wet InP etching process using an etching solution of $1HCl:3H_3PO_4$, a etching rate of 1 micrometer/minute is attained, and an InP wall post structure 52 with a height of about 80 micrometer (corresponding to the height of the micro-lens thus formed) and a width at top of about 25 micrometer. This wall post structure is defined in the direction parallel to the sub-plane of the wafer, i.e., in the [x,y,z]=[1,1,0] direction. A silicon nitride (SiNx) anti-reflective layer 53 with thickness of about 0.15 micrometer and a refractive index of about 2.0 is formed on both sides of the wall post structure by using plasma-enhanced chemical vapor deposition (PECVD) and reactive ion etching (RIE) processes. After formation of this wall post structure, a polymer film coverage process can be then carried out. In this embodiment, a ma-P series photoresist available from Micro Resist Technology Company is used to apply on the surface of a test sample through a spin-coating process. FIG. 5C shows schematically the photoresist distribution profile 54 after the photoresist coating. A micro-photolithographic process is used to define the volume of the photoresist required by the micro-lens, and a longer developing period is used to remove the very thin photoresist on the top of the wall post structure so as to isolate photoresists between both sides of the wall post structure. FIG. 5D shows at 541 and 542 sections of photoresists after developing. In order to let the bottom surface of the photoresist to detach from the InP substrate and hence let the photoresist layer to adhere only onto both sides of the wall post structure 52, in this embodiment, an etching solution of $1HCl:3H_3PO_4$ is used to perform the wet etching process on the InP substrate. In this etching process, the etching solution not only etches InP substrate further downward, but also undergoes transverse etching and hence renders the photoresist bottom detach from InP substrate. After this wet etching process, the wall post structure extends downward about 40 micrometer. At this stage, photoresists 541 and 542 as shown in FIG. 5E adhere onto both sides of the wall post structure 521. A proper baking at an elevated temperature (about 100° C.) before etching can enhance the adhesion between the photoresist and the side surface of the wall post structure, reduce collapse or peel phenomena, and improve the uniformity for fabricating micro-lens on the overall InP substrate. It is noteworthy further that, after wet etching InP twice, a surface thickness of about 120 micrometer of InP substrate is etched. Nonetheless if there is no protection for the back surface of the InP substrate, such as SiOx or SiNx grown by PECVD, then the likewise removal of the thickness of about 120 micrometer from back surface of the InP substrate will influence the mechanical strength of the substrate 501.

After the above-described etching process, the photoresist has adhered onto both sides of the wall post structure, and forms independently the basic structure for fabricating micro-lens. Baking this structure at 150° C. in a nitrogen atmosphere for 10 minutes makes photoresist at both sides cohering into plano-convex lens due to surface tension, as shown at 543 and 544 in FIG. 5F. It should be noted that, since a wet etching process is employed in this embodiment, in order to prevent photoresist from generation of bubbles under heat flow, a drying pretreatment should be performed on the sample before heat flow, such as removing the water molecule trapped in the structure of the sample by placing in a dry nitrogen atmosphere at an ambient temperature. The both side photoresist plano-convex micro-lens obtained in this embodiment has a height of about 80 micrometer, a thickness of 15 micrometer and a curvature radius of about 60 micrometer. By controlling the volume of the photoresist at both sides, the requirement of micro-optical/micro-optoelectronic system can be attained, such as the asymmetric composite biconvex micro-lens as shown at 545 and 546 in FIG. 5G as well as the composite plano-convex micro-lens shown at 547 in FIG. 5H.

Since the ma-P series photoresist (Micro Resist Technology Co., Ltd.) used in this embodiment exhibits a refractive index of 1.5–1.6, with a difference within 10% relative to the refractive index (1.45–1.47) of silicon dioxide and hence a reflective loss of only −26 dB, it can be used directly as a composite material for fabricating biconvex micro-lens. Further, by virtue of the wall post structure in this composite material micro-lens, a light filtering effect against the incident light can be obtained, such as, for example, the InP wall post structure in this embodiment can filter off the wave with a wavelength below about 0.9 micrometer, which is useful for filtering off short wave exciting light source in a practical application. It has to emphasize that, since the ma-P series photoresist belongs to positive type photoresist, it is susceptible to be catalyzed during using in a long period of exposure. Therefore, a negative type photoresist can be used instead, such as, for example, ma-N series (Micro Resist Technology Co., Ltd.) or BPR-100 (Shipley Co., Ltd.) to promote the stability of the micro-lens.

The process for fabricating a micro-lens provided according to the invention exhibits following advantages over conventional techniques:
1. The micro-lens of the invention can be fabricated by a conventional semi-conductor manufacturing process.
2. A more simplified integrating way is provided for the micro-lens and micro-optical system (the second embodiment).
3. During the fabricating process, it is possible to control flexibly the operation condition to form micro-lens with various shapes and functions.

Many changes and modifications in the above described embodiment if the invention can, of course, be carried out without departing from the scope thereof. Accordingly, to promote the progress in science and the useful arts, the invention is disclosed and is intended to be limited only by the scope of appended claims.

To conclude the above-mentioned, the present invention not only is a sure innovation of a technical idea but also has multiple efficacies the conventional methods cannot achieve, thus already meets the prerequisite conditions of novelty and inventive step for claiming an invention, therefore an application of this invention is brought up according to law for the approbation.

Many changes and modifications in the above described embodiment if the invention can, of course, be carried out without departing from the scope thereof. Accordingly, to promote the progress in science and the useful arts, the invention is disclosed and is intended to be limited only by the scope of appended claims.

What is claimed is:

1. A process for fabricating micro-optical iens, comprising following steps:
    step 1, providing a substrate consisting at least a substrate and a dielectric layer grown on the substrate;
    step 2, applying an etching mask on said dielectric layer to define an etching region;
    step 3, removing downwardly a first thickness from said etching region, and remaining a second thickness, to form a wall post structure on the surface of said dielectric layer;
    step 4, applying a polymeric film over said substrate having said wall post structure thereon;
    step 5, defining a volume of said micro-lens on said polymeric film;
    step 6, performing an etching process to remove the dielectric layer beneath said polymeric film, such that said polymeric film becomes adhering onto both sides of said wall post structure;
    step 7, removing the polymeric film from a top of said wall post structure such that the polymeric films on both sides of said wall post structure are isolated completely from each other; and
    step 8, subjecting said polymeric film adhered separately on both sides of said wall post structure to a baking such that said polymeric films cohere into a shape of piano-convex lens, and hence there is formed a biconvex micro-lens.

2. A process for fabricating a micro-optical lens as recited in claim 1, wherein the thickness of said dielectric layer in the step 1 must be greater than the height of said micro-lens.

3. A process for fabricating a micro-optical lens as recited in claim 1, wherein said first thickness in said step 3 is equal to the height of said micro-lens to be fabricated.

4. A process for fabricating a micro-optical lens as recited in claim 1, wherein said polymeric film in step 4 has a property of cohering under heat flow.

5. A process for fabricating a micro-optical lens as recited in claim 1, wherein said step 8 comprises further a step of imaging the profile of a micro-lens onto said wall post structure by a dry etching process to form a single material biconvex micro-lens.

6. A process for fabricating a micro-optical lens as recited in claim 1, wherein the height, thickness and curvature radius of said micro-optical lens is adjusted by controlling the volume of said polymeric film.

7. A process for fabricating a micro-optical lens, comprising following steps:
    step 1, providing a substrate consisting at least a substrate and a dielectric layer grown on the substrate;
    step 2, applying a first etching mask on said dielectric layer to divide it into a etching region and a wall post structure, then removing downwardly a first thickness from said etching region to form a wall post structure on the surface of said dielectric layer;
    step 3, applying a second etching mask on said etching region to define a platform region, then removing downwardly a second thickness from said etching region except said platform region, and remaining a third thickness;
    step 4, applying a polymeric film over said substrate having said wall post structure thereon;
    step 5, defining a volume of said micro-optical lens on said polymeric film;
    step 6, performing an etching process to remove the dielectric layer beneath said polymeric film, such that said polymeric film becomes adhering onto both sides of said wall post structure;
    step 7, removing the polymeric film from a top of said wall post structure such that the polymeric films on both sides of said wall post structure are isolated completely from each other; and
    step 8, subjecting said polymeric film adhered separately on both sides of said wall post structure to baking such that said polymeric films cohere into a shape of piano-convex lens; and
    step 9, imaging the profile of the polymeric lens on the outer side of said wall post structure by a low selective etching process to form a prepositive dielectric piano-convex lens.

8. A process for fabricating a micro-optical lens as recited in claim 7, wherein the thickness of said dielectric layer in the step 1 must be greater than the height of said micro-lens.

9. A process for fabricating a micro-optical lens as recited in claim 7, wherein the height of said platform region in step 3 is one half the height of said wall post structure.

10. A process for fabricating a micro-optical lens as recited in claim 7, wherein said polymeric film in step 4 has a property of cohering under heat flow.

11. A process for fabricating a micro-optical lens as recited in claim 7, wherein the height, thickness and curvature radius of said micro-optical lens is adjusted by controlling the volume of said polymeric film.

12. A process for fabricating a micro-optical lens, comprising following steps:

step 1, providing a semiconductor substrate;

step 2, applying an etching mask on said semiconductor substrate to define an etching region;

step 3, removing downwardly a first thickness from said etching region to form a wall post structure on the surface of said semiconductor substrate;

step 4, forming an anti-reflective dielectric layer on both sides of said wall post structure, respectively;

step 5, applying a polymeric film on the wall post structure having an anti-reflective dielectric layer;

step 6, defining the volume of said micro-optical lens on said polymeric film;

step 7, performing an etching process to remove the semiconductor substrate beneath said polymeric film, such that said polymeric film becomes adhering onto both sides of said wall post structure;

step 8, subjecting the polymeric film on both sides of said wall post structure to baking at an elevated temperature, such that the polymeric film coheres into a shape of a piano-convex lens to form a composite material biconvex lens.

13. A process for fabricating a micro-optical lens as recited in claim 12, wherein said first thickness in step 3 is equal to the height of the lens to be fabricated.

14. A process for fabricating a micro-optical lens as recited in claim 12, wherein said anti-reflective dielectric layer in step 4 is a silicon dioxide layer.

15. A process for fabricating a micro-optical lens as recited in claim 12, wherein said anti-reflective dielectric layer in step 4 is a silicon nitride oxide layer.

16. A process for fabricating a micro-optical lens as recited in claim 12, wherein said anti-reflective dielectric layer in step 4 is a silicon nitride layer.

17. A process for fabricating a micro-optical lens as recited in claim 12, wherein said anti-reflective dielectric layer in step 4 is a titanium dioxide layer.

18. A process for fabricating a micro-optical lens as recited in claim 12, wherein said anti-reflective dielectric layer in step 4 is a tantalum oxide layer.

19. A process for fabricating a micro-optical lens as recited in claim 12, wherein said anti-reflective dielectric layer in step 4 is an aluminum oxide layer.

20. A process for fabricating a micro-optical lens as recited in claim 12, wherein said polymeric film in step 5 has a property of cohering under heat flow.

21. A process for fabricating a micro-optical lens as recited in claim 12, wherein the height, thickness and curvature radius of said micro-optical lens is adjusted by controlling the volume of said polymeric film.

22. A process for fabricating a micro-optical lens as recited in claim 12, wherein said composite material biconvex lens is symmetric.

23. A process for fabricating a micro-optical lens as recited in claim 12, wherein said composite material biconvex lens is asymmetric.

24. A process for fabricating a micro-optical lens as recited in claim 12, wherein said composite material biconvex lens comprises a composite material plano-convex lens.

* * * * *